Sept. 27, 1932.  F. W. BLANDFORD  1,879,050
SHOCK ABSORBER
Filed April 25, 1931  2 Sheets-Sheet 1
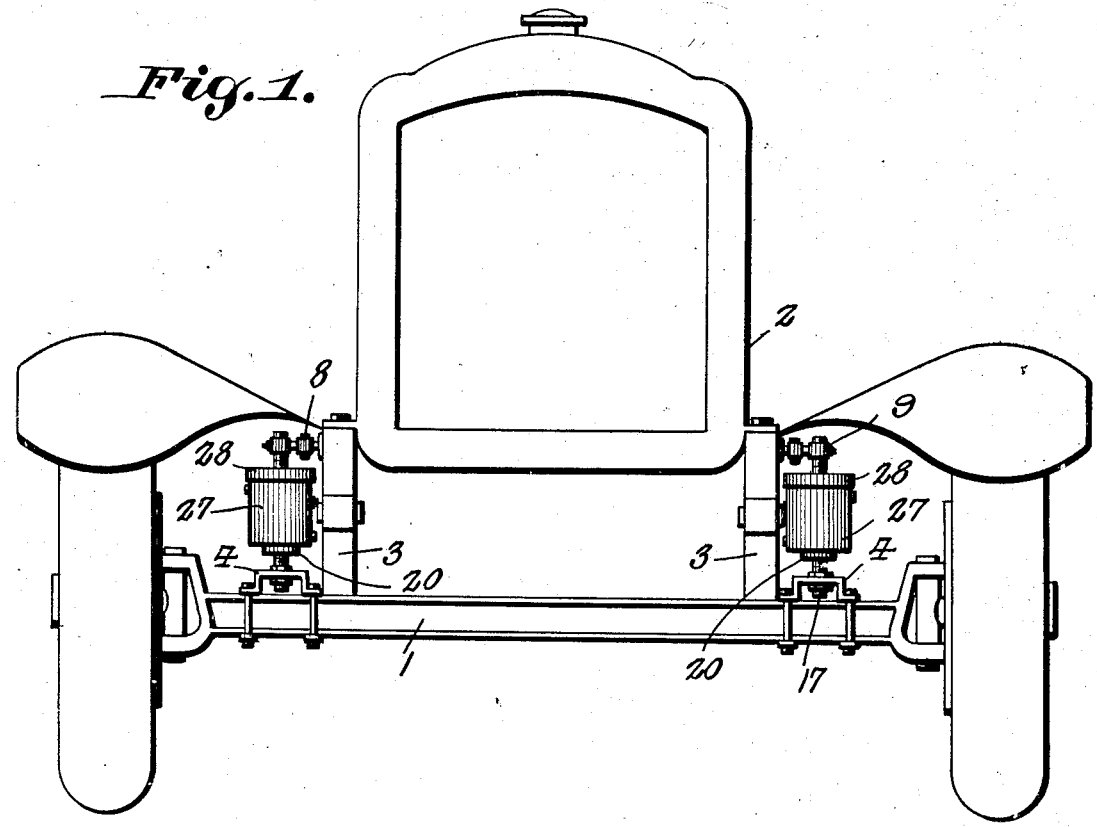
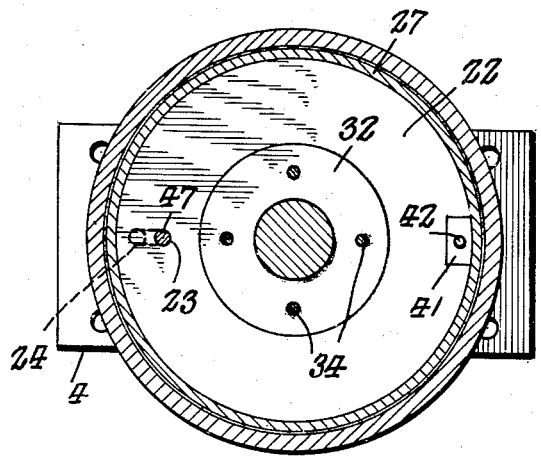
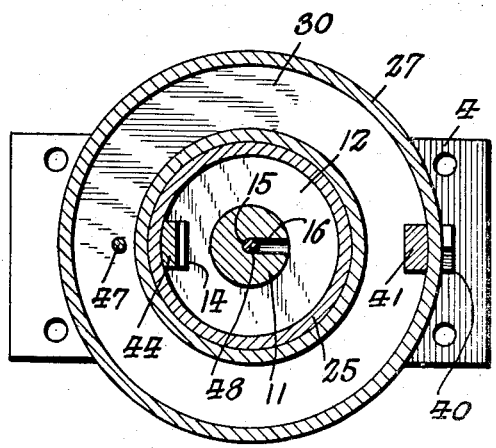
Francis W. Blandford,
INVENTOR
BY Victor J. Evans
and Co.
ATTORNEY Sept. 27, 1932.  F. W. BLANDFORD  1,879,050
SHOCK ABSORBER
Filed April 25, 1931  2 Sheets-Sheet 2

Francis W. Blandford,
INVENTOR
BY Victor J. Evans
and Co.  ATTORNEY

Patented Sept. 27, 1932

1,879,050

UNITED STATES PATENT OFFICE

FRANCIS WILLIAM BLANDFORD, OF PRINCE ALBERT, SASKATCHEWAN, CANADA

SHOCK ABSORBER

Application filed April 25, 1931. Serial No. 532,905.

My present invention has reference to a shock absorber for automobiles, trucks and like vehicles.

The primary object is the provision of a hydraulic shock absorber that includes means for retarding the upward and downward movements of the body of the vehicle to compensate and practically overcome rebound shocks to which the body would otherwise be subjected to and likewise to compensate and absorb the shocks and jars to which the body of the vehicle would be otherwise subjected when the wheels of the vehicle meet with obstructions in passing over uneven road surfaces, such shocks being absorbed in a manner that will obviate the liability of the jolting of the body.

A further object is the provision of a hydraulic shock absorber for vehicles that includes two pistons, one attached to the springs or body of the vehicle and the other to the axles of the vehicle, both the pistons acting on a fluid body in a manner to direct the fluid against the opposite sides or faces of the pistons when the said pistons have been moved by the shocks or jars to which the vehicle is subjected, and wherein the construction and arrangement of parts is such that the said shocks and jars will be absorbed in a quick but easy and efficient manner so that the same will not be imparted to the body of the vehicle.

The invention will be fully and comprehensively understood from a consideration of the following detailed description when read in connection with the accompanying drawings which form part of the application, with the understanding, however, that the improvement is capable of extended application and is not confined to the exact showing of the drawings nor to the precise construction described and, therefore, such changes and modifications may be made therefrom as do not affect the spirit of the invention nor exceed the scope thereof as expressed in the appended claims.

In the drawings:

Figure 1 is a front elevation of an automobile equipped with the improvement.

Figure 3 is a sectional view approximately on the line 3—3 of Figure 2.

Figure 4 is a sectional view approximately on the line 4—4 of Figure 2.

Figure 2:
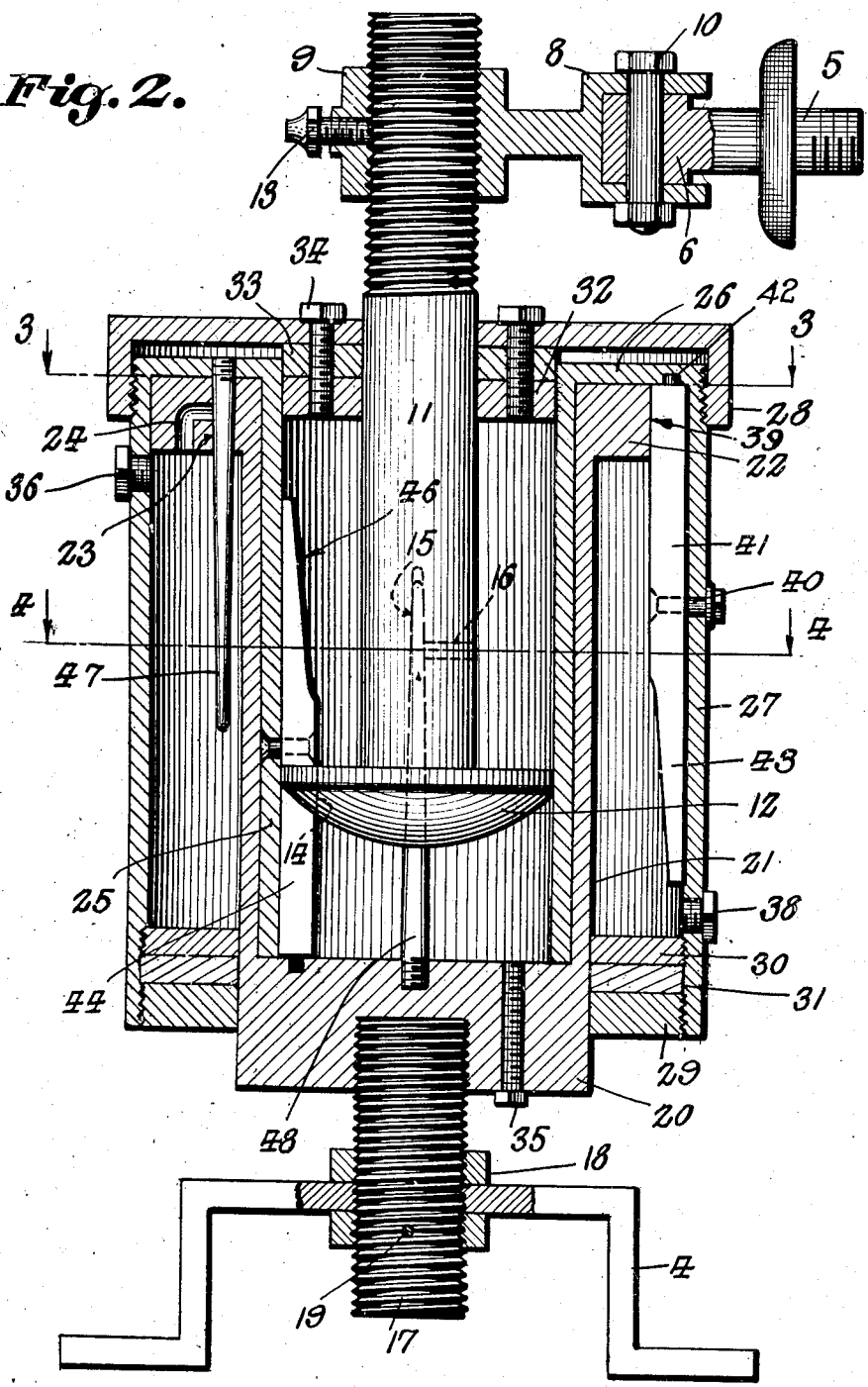
Figure 2 is an enlarged substantially vertical transverse sectional view through the improvement.

In Figure 1 of the drawings I have illustrated the improvement applied to the front of an ordinary automobile construction but obviously the improvement is also designed to be attached to the rear of such vehicle.

On the axle 1 of the automobile 2, outward of the body supporting springs 3 I secure the straight ends of substantially U-shaped brackets 4. Above the brackets and either to the outer faces of the springs 3 or to the side members of the chassis, I secure bolt members 5 which have their outer ends provided with round heads 6, each of the said heads having a central opening therethrough. The heads are straddled by the bifurcated ends 8 on the shanks of interiorly threaded collars 9. A vertically disposed pivot pin 10 passes through the arms of the bifurcated ends 8 of the collar and through the head 6 of the bolt 5. The pin is preferably in the nature of a bolt that is engaged by a nut and establishes a joint which is swingable in a horizontal direction between the bolt 5 and the collar 9.

Screwed through the collar there is the threaded end of the stem 11 of a piston 12. A binding screw 13 holds the stem adjusted in the collar 9. The piston is round in plan and preferably has its outer face convexed as disclosed by the drawings and this piston is provided, from its periphery with a substantially rectangular notch 14 in the nature of a fluid port. The piston from its head is provided with a longitudinal bore 15 which is slightly tapered and with a transverse port 16 that communicates with its bore. Screwed through the center of the bracket 4 there is a headless bolt 17. The bolt is held adjusted on the bracket by nuts 18 which contact with both the upper and lower faces of the bracket and one or both faces of the nuts are held on the headless bolt by a cotter or like pin 19.

The outer end of the headless bolt 19 is screwed in the threaded opening in the comparatively thick bottom portion 20 of the cylindrical body 21 of the plunger. The plunger is formed on the open end of the cylindrical body by forming the said body with an outwardly extending flange 22. The outwardly extending annular head 22 of the cylindrical plunger 21 has a slightly tapered bore 23 extending therethrough and communicating with the bore there is an angular port 24 which also communicates with the inner or lower face of the plunger head 22. The cylindrical body 21 of the plunger has received therein a cylinder 25. The cylinder has its upper or outer end formed with an annular outwardly directed flange 26 and from whose periphery there depends a cylindrical member in the nature of a cylindrical skirt 27. The skirt 27, at its juncture with the flange 26, is provided with outer threads and has its lower and open end provided with internal threads. The exterior threads are engaged by internal threads on the flange of a cap or closure member 28. The lower internal threads have screwed therein spaced disc heads 29 and 30, respectively, and arranged between the heads 29 and 30 there is a compressible disc gasket 31. The body 21 of the plunger is received through the central openings in the heads 29 and 30 and is engaged by the inner peripheral wall of the washer or gasket 31.

The inner cylinder 25, at the end thereof provided with the outstanding disc flange 26, has arranged therein a disc closure 32. On the disc there is a compressible gasket 33, and both the disc head 32 and the gasket 33 are attached to the cap member 28 by spaced headed bolts 34. By adjusting the bolts the gasket 33 is expanded to establish a tight joint between the closure disc 32 and the cylinder 25. One of these bolts is removed so that a liquid is poured through the opening normally occupied thereby into the cylinder 25, the said liquid filling the cylinder to a desired height. The liquid is non-freezible, comprising glycerine and distilled water in suitable proportions, and this liquid may be drained from the cylinder through an opening that is normally closed by a headed bolt 35 which is screwed through the thickened end 20 of the plunger 21. A similar liquid is let through an opening in the outer cylinder 27, the said opening being normally closed by a headed plug 36, and the liquid may be drained from the said cylinder through another and lower opening which is also closed by a headed and threaded plug 38.

The plunger head 22 has a peripheral and substantially rectangular notch in the nature of a fluid port 39 therein, and the inner wall of the outer cylinder 27 has secured thereto by means of a bolt 40 engaged by a suitable nut, a cross sectional rectangular member which I will term a valve key and which is indicated by the numeral 41. The valve key has its end which contacts with the flange 26 provided with a stud 42 that it let in a suitable depression on the inner face of the said head or flange 26. The key 41 terminates a distance away from the inner head 30 of the outer cylinder and has its outer face, from its said end, tapered for a determined distance, as indicated by the numeral 43. Secured to the inner wall of the cylinder 25 by a rivet or the like there is another and oppositely directed valve key 44, one end of which normally contacts with the thickened end or head 20 of the cylindrical plunger body 21. The valve key 44 terminates a suitable distance away from the disc head 32, and has its inner face, from its said end, tapered, as at 46, for a suitable distance. The valve key 44 is designed to be received through the rectangular notch 4 in the piston head 12.

Secured to the cylinder head 26 there is a depending slightly tapered control rod 47 that is received through the slightly tapered bore 23 in the plunger head 22 and centrally secured to the head 20 of the plunger body 21 there is an upwardly directed slightly tapered control rod 48 which is received in its bore 15 in the piston 12 and in the shank 11.

Should the body of the vehicle be subjected to a jar in a downward direction such jar will be absorbed by the cushioning effect of the piston 12 on the liquid below the said piston. Such downward movement of the piston is sufficiently quick or active to prevent the vehicle body being subjected to a jar or shock by such downward movement. Should the springs expand with a tendency to move the body outwardly the piston 12 will be gradually moved in an upward direction in the inner cylinder. This upward movement of the piston causes the same to move partly off of the tapered control rod 48 to uncover the port 16 which permits the liquid above the piston to travel through the port 16 and through the bore 15 below the piston head, and when the piston is moved to bring the notched portion thereof opposite the tapered portion 46 of the valve key 44 the liquid will flow through the notch 14, equalizing the pressure upon both sides of the piston and effectively absorbing the rebound shock of the vehicle springs. Should the wheels of the vehicle fall into a rut the wheels, incident of their spring connection with the body will move downwardly at a slightly greater rate of speed than will the body and the plunger head 22 will be moved downwardly against the pressure of the liquid in the outer cylinder 27. This downward movement of the plunger is sufficiently quick to prevent the shock being absorbed by the vehicle body. The downward movement of the plunger moves the control rod 47 through the tapered bore 23, permitting the liquid to flow through the port 24 and through the bore 23 against the top of the plunger head 22 and when the plunger head 22 has moved on the valve key 41 to bring its notch 39 in a line with the tapered face or end 43 of the said valve key 41, the liquid will flow from below to above the head 22 of the plunger 21 and such liquid will be returned through the bore 23 and port 24 when the plunger 21 returns to its initial position after absorbing the shock which would otherwise be subjected to the vehicle body. Thus with my improvement it will be noted that rebound shocks incident to the expansion and contraction of the springs and road shocks incident to the sinking of the vehicle in road ruts or shocks incident to the wheels of the vehicle contacting with obstructions in the road will be effectively absorbed. The last mentioned or bump shocks are absorbed by the upward movement of the plunger 21 contacting with disc head 26 of the plunger 25 causing the piston 12 to act upon the fluid body in the inner plunger 25 in the same manner as that previously described.

It is believed that the construction and advantages of my hydraulic shock absorber will be understood and appreciated when the foregoing description has been carefully read in connection with the accompanying drawings and that further detailed description will not be required.

Having described the invention, I claim:

1. A hydraulic shock absorber for vehicles, comprising inner and outer fluid containing cylinders, a piston fixed to the vehicle body and working in the inner cylinder, a plunger in the outer cylinder working in the outer cylinder, and the plunger and the piston having fluid ports, and fixed means for controlling the ports to permit of a small flow of fluid therethrough to direct fluid from one to the other side of the plunger or piston when the said plunger and piston have been moved predetermined distances in the cylinders.

2. A hydraulic shock absorber for vehicles, comprising inner and outer fluid containing cylinders, a piston fixed to the vehicle body and working in the inner cylinder, a plunger in the outer cylinder, guided by and, working in the outer cylinder, and the plunger and the piston having fluid ports, and fixed means for controlling the ports to permit of a small flow of fluid therethrough to direct fluid from one to the other side of the plunger or piston when the said plunger and piston have been moved predetermined distances in the cylinders.

3. A hydraulic shock absorber for vehicles, comprising an inner fluid containing cylinder and an outer fluid containing cylinder, means for admitting fluid into the cylinders and means for draining the fluid from the cylinders, a piston working in the inner cylinder, and having a pivoted connection with the body of the vehicle, a plunger in the outer cylinder and connected with the axle of the vehicle, said plunger and piston being oppositely directed, and being provided with ports, and oppositely directed fixed control members in the cylinders received in the piston and plunger, controlling the ports and permitting fluid to slowly flow through the ports to the opposite sides of the plunger and piston when the said plunger and piston have been moved by shocks and jars to predetermined distances.

In testimony whereof I affix my signature.

FRANCIS WILLIAM BLANDFORD.